Figure 3:
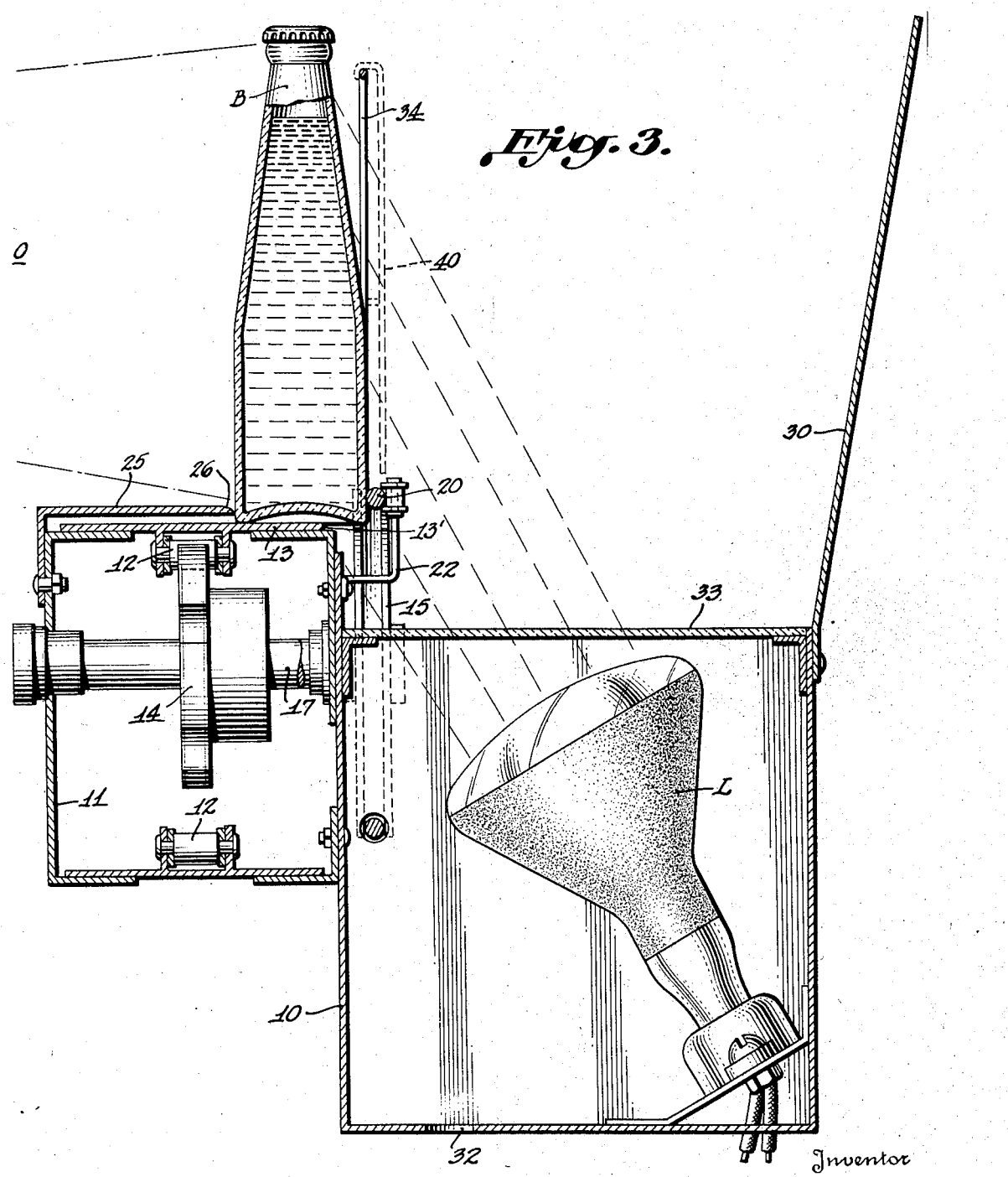

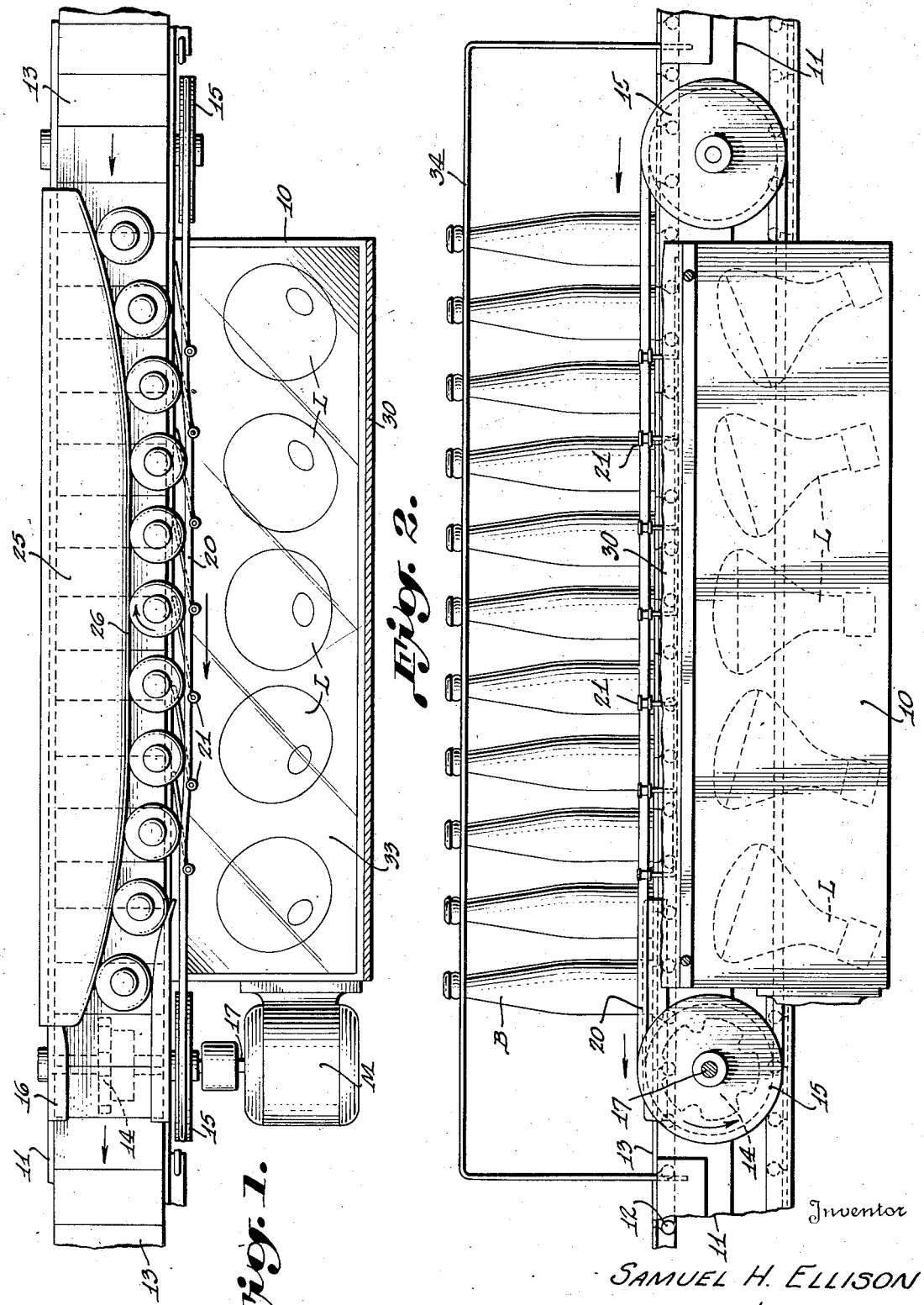

Jan. 30, 1945. S. H. ELLISON 2,368,350
METHOD OF AND APPARATUS FOR INSPECTING FLUIDS
Filed April 4, 1942 2 Sheets-Sheet 2

Inventor
SAMUEL H. ELLISON
By Albert J. Kegan
Attorney

Patented Jan. 30, 1945

2,368,350

UNITED STATES PATENT OFFICE 2,368,350

METHOD OF AND APPARATUS FOR INSPECTING FLUIDS

Samuel H. Ellison, Berwyn, Ill., assignor to Tru-Ade, Inc., Chicago, Ill., a corporation of California Application April 4, 1942, Serial No. 437,699

13 Claims. (Cl. 88—14)

The present invention relates to an improved method and apparatus for detecting imperfect bottles and foreign matter in the bottles containing liquid, particularly those containing microscopic particles in suspension or in colloidal dispersion, as for example, orange juice beverages.

It is an object of the present invention to provide a rapid and effective inspecting arrangement for the purpose of detecting foreign objects in a liquid normally containing suspended matter in sufficient quantities to cause it to be relatively opaque. The principle is the same for clear liquids, but in practice, opaque liquids are more difficult to inspect.

It is a further object of the invention to provide an arrangement which enables the discarding of bottles with faulty bases in the course of the inspection of such bottles for foreign objects contained in the liquids with which they are filled.

It is a further object of the invention to provide an inspecting arrangement which may be applied with facility and low cost to conventional bottle conveyors.

The present invention proceeds upon the principle of the utilization of the Tyndall effect to impart secondary luminescence to material in suspension against which is contrasted any foreign objects which may be present in the liquid containing the colloidally dispersed material. This principle is applied in the preferred embodiment of the invention by conveying a series of light-permeable containers in the form of bottles containing beverages, past an inspecting station whereat an observer is positioned to examine each bottle as the same is transported across his field of vision past the inspecting station. A source of strong light is arranged behind the conveyor and is adapted to direct the beam of light upwardly in order to strike at least a portion of the base of the bottles as well as the walls of the bottles remote from the observer and in intersecting relation with the normal range of vision of the observer in advance of him. Preferably the source of the beam of light is positioned and housed below the bottle supporting level of the conveyor so that it is invisible from the point of inspection and no glare from the source of light is directed at the inspector. The containers are preferably rotated in the course of their passage past the source of light so that an examination of the complete lateral surfaces may be had in the course of the passage thereof in order to reveal any foreign particles no matter where they may be present in the containers and also to make it necessary to see only half way through a relatively opaque liquid.

During the interval that the container is exposed to the beam of light, the suspended and/or colloidally dispersed material normally present therein scatters the light throughout the body of the fluid; said suspended and/or colloidal particles thus become secondary sources of illumination, and the entire body of fluid glows brightly. Since the container is in the field of vision of the inspector, the brightly glowing fluid forms a medium against which foreign objects stand out with great distinctness. The beam of light does not enter the inspector's field of vision, and therefore he is subject to no strain due to glare, seeing only the soft secondary illumination in each bottle as it passes into the inspection position.

The visibility of the foreign particles may be facilitated by the provision of a dark or black non-reflecting screen behind the line of bottles to eliminate glare due to reflection and to form a background which is restful to the observer's eyes.

In the preferred embodiment of the invention, provision is made for subjecting at least a portion of the base of each bottle to the beam of light in order to impart the desired glow effect thereto, at which time the bases of the bottles are brought in overhanging relation with respect to the supporting flight of the conveyor. The slight unbalance created by this condition, coupled with the rotary movement which is imparted to the bottles by an auxiliary belt acting upon the lateral surfaces of the bottles adjacent to the bases thereof, creates an unbalanced condition in those bottles in which the bases are chipped to such an extent that they lean or fall over, attracting the attention of the observer. In this way, the bottles are inspected for both foreign matter in the contents and imperfections in the container in the course of a single operation in order to expedite the inspecting function. Thus, the bases of the bottles are inspected automatically.

Other objects and purposes will appear from a more detailed description of the invention following hereinafter, taken in conjunction with the accompanying drawings, wherein Fig. 1 is a plan view of the preferred embodiment of the device;

Fig. 2 is a front elevation of Fig. 1 with the driving shaft at the left in section, and Fig. 3 is a vertical sectional view of Figs. 1 and 2 with certain parts in elevation at the left end of Figs. 1 and 2.

A suitable frame may be arranged to support the inspecting station which consists essentially of a casing 11 for supporting the advancing and returning flights of an endless conveyor 13 integrated by lugs 12 which ride on a sprocket 14 driven by an electric motor M. The bottles B undergoing inspection are adapted to be placed upon one end of the conveyor and are designed to be carried by the conveyor to the opposite end thereof past the inspecting station, as shown in Fig. 1, wherein the bottles are indicated to be traveling from right to left. As the bottles advance towards the inspecting station, a guide rail 25 provided with a convexly-shaped edge forces the bases of the bottles into overhanging relationship with the rear edge 13' of the conveyor chain 13 in order to permit the light projected upwardly from the light sources L to strike the bases of the bottles as well as the rear walls thereof. The casing 10, for housing the lamps L, is mounted adjacent to the frame 11 and is provided with a glass cover 33 at the top thereof and ventilating openings 32 in the base thereof. For example, the lamps L may be a plurality of 150 watt light sources of the type G. E. Reflector-Spot Inside Silvered, and five of such lights may be provided in the housing 10 constituting the inspecting station.

As explained above, the strong light which strikes upwardly at least against a part of the bases and the rear lateral walls of the bottles, serves to impart to them a glow effect according to the Tyndall principle when the bottles contain liquids with material in suspension or colloidal dispersion such as orange juice beverages. At the same time the light is directed upwardly so that the normal range of vision of the operator at O is not subjected to any direct glare from the lights L and he can only see the glowing bottles as they travel past the inspecting station. Should any foreign particles be present in the bottles, they become immediately perceptible, particularly when a dark or black non-reflecting screen 30, which may be a blackboard, is mounted at the rear of the housing 10 behind the line of bottles.

In order to execute a complete inspection of the bottles, they are rotated by the provision of an endless belt 20 which travels over pulleys 15, one of which is mounted on the shaft 17 together with the sprocket 14. The pulley 15 is of greater circumference than the sprocket 14 so that the same angular velocity for these elements imparts a greater linear velocity to the belt 20 than the conveyor 13 so that the travel of the belt 20 against the lateral walls of the bottles imparts rotation to them when the bottles are pressed against the belt by the convex outline 26 of the guide 25. Furthermore, the faster movement of belt 20 effects a spacing between the bottles. This pressure may further be controlled by backing rollers or pulleys 21 which are rotatably mounted on spring rods 22 which in turn may be mounted upon the frame housing 11. By adjusting these spring rods the yield of the belt in response to the pressure of the bottles thereagainst may be adjusted.

The operation of belt 20 on the lateral surface of the bottles adjacent to the base thereof to impart rotation thereto in conjunction with the overhang of a portion of the bases from the rear edge 13' of the conveyor 13, effects an unbalance of the bottles if the bases are chipped to such a degree that their discarding is desirable. The inspector may discard any bottles in which an unbalance or tilting thereof indicates such action advisable, as well as those bottles which reveal the existence of foreign particles therein.

When clear liquids are undergoing inspection, a frosted glass screen 40 may be mounted directly behind the bottles on a guard rail 34 for the bottles mounted on the casing 11. This screen glows under the light and provides the necessary luminescent background in order to reveal the existence of foreign particles therein. Such a screen is shown in dotted lines in Fig. 3.

While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. The method of detecting foreign matter in a light permeable receptacle for liquid containing colloidally dispersed material, which comprises directing light angularly against the wall of the receptacle remote from the observer and intersecting the observer's normal range of vision in advance of the point of observation, thereby causing said colloidally dispersed material to scatter light throughout the liquid and create a secondary luminescence therein, and observing said liquid to determine whether there is any localized change in the intensity of said secondary luminescence.

2. The method of detecting foreign matter in a liquid contained in a light-permeable receptacle and having colloidally dispersed material therein, which comprises directing a light beam upwardly against at least a portion of the base and the wall of the receptacle remote from the observer and intersecting the observer's normal range of vision in advance of the point of observation, thereby causing said colloidally dispersed material to scatter light from said beam throughout said liquid, thereby causing said liquid to glow, and observing the same to determine whether there is a localized change in the intensity of said glow, said localized change indicating that there is foreign matter in said receptacle.

3. The method of detecting foreign matter in a glass bottle of liquid containing colloidally dispersed material, which comprises directing light upwardly against at least a portion of the base and the wall of the bottle remote from the observer and in intersecting relation with the normal range of vision and in advance of the observer, thereby creating a secondary luminescence in said liquid due to scattering of said light by said colloidally dispersed material, and looking for an object visible in said bottle against the background of said secondary luminescence.

4. The method of detecting foreign matter in bottles of liquids containing colloidally dispersed material which comprises passing the bottles past an inspection station while rotating them in upstanding position, and directing light upwardly against at least a portion of the base and the wall of each of the bottles remote from the observer and in intersecting relation with the normal range of vision and in advance of the observer, thereby causing said liquid to glow, and observing foreign matter in said bottles rendered visible against the background of said glowing liquid.

5. An inspecting apparatus for detecting foreign objects in light permeable receptacles containing liquid, comprising a conveyor for transporting said receptacles past an inspecting station, a light source at said station outside the observer's normal range of vision, means for projecting a light beam from said source in intersecting relation with the observer's normal range of vision, and guiding means comprising a shaped rail and resilient means for holding said receptacles against said rail, said guiding means being arranged to displace said receptacles laterally upon said conveyor, thereby increasing the exposure of each receptacle to said light beam while said receptacle is passing said inspecting station.

6. An inspecting apparatus for detecting faulty light permeable receptacles filled with liquid comprising a conveyor for transporting the receptacles past an inspecting station, a light source at said station below the transporting level of the conveyor and beyond the observer at the inspecting station, means for directing the light from said source upwardly against at least a portion of the base and wall of each receptacle adjacent to said light source in intersecting relation with the normal range of vision and in advance of the observer, and guiding means cooperating with said conveyor at said inspecting station for partially eliminating the support afforded said receptacles by said conveyor and thereby simultaneously exposing a portion of the base of each receptacle to the light source in the course of movement thereof past said light source.

7. An inspecting apparatus for detecting faulty bottles filled with liquid comprising a conveyor for transporting the bottles in upright position past an inspecting station, a light source at said station below the transporting level of the conveyor and beyond the observer at the inspecting station, means for directing the light from said source upwardly against each bottle in intersecting relation with the normal range of vision and in advance of the observer, guiding means cooperating with said conveyor at said inspecting station for partially eliminating the support afforded said bottles by said conveyor and thereby simultaneously exposing the rear portion of the base of each bottle to the light source in the course of movement thereof past said light source, and an endless transmission band cooperating with the lateral walls of the bottles at the light incident portions thereof and traveling at a faster rate than said conveyor to impart rotary movement to the bottles to facilitate the inspection of the contents thereof.

8. The apparatus as set forth in claim 7, wherein said last-mentioned transmission band turns the bottles to such a degree that any faulty balance of the bottles occasioned by defective bases is enhanced by such turning action.

9. An inspecting apparatus for detecting foreign matter in glass bottles filled with liquid containing colloidally dispersed material comprising a conveyor for transporting the receptacles past an inspecting station, a light source at said station below the transporting level of the conveyor and beyond the observer at the inspecting station, means for directing the light from said source upwardly against each bottle in intersecting relation with the normal range of vision and in advance of the observer to impart a secondary luminescence to the colloidally dispersed material and to render visible foreign matter in said bottles by the absence of luminescence thereat, and an endless transmission band cooperating with the lateral walls of the bottles at the light incident portions thereof traveling at a faster rate than said conveyor to impart rotary movement to the bottles to facilitate the inspection of the contents thereof.

10. An inspecting apparatus as set forth in claim 9 wherein a dark non-reflecting screen is provided beyond the conveyor remote from the observer to enhance the contrasting visibility of the foreign matter in the field of secondary luminescence.

11. An inspecting apparatus for detecting foreign matter in transparent bottles containing colloidal material, comprising a conveyor for transporting said bottles past in inspecting station, a light source placed lower than said bottles at said station, means for directing the light from said source in intersecting relation with the inspector's normal range of vision, guiding means cooperating with said conveyor at said inspecting station for moving said bottles part way off said conveyor, thereby exposing a portion of the base of each bottle to said light source while said conveyor transports said bottle past said inspecting station, and means contacting the lateral walls of said bottles at said inspecting station and operating to rotate said bottles during inspection thereof.

12. An inspecting apparatus for detecting opaque foreign matter in glass bottles filled with liquid containing colloidally dispersed material comprising a conveyor for transporting the receptacles past an inspecting station, a light source at said station below the transporting level of the conveyor and beyond the observer at the inspecting station, means for directing the light from said source upwardly against at least a portion of the base and wall of each receptacle adjacent to said light source in intersecting relation with the normal range of vision and in advance of the observer to impart a secondary luminescence to the colloidally dispersed material and to render visible foreign matter in said receptacles by the absence of luminescence thereat, guiding means cooperating with said conveyor at said inspecting station for partially eliminating the support afforded to said receptacles by said conveyor and thereby simultaneously exposing a portion of the base of each receptacle to the light source in the course of movement thereof past said light source, and an endless transmission band cooperating with the lateral walls of the bottles at the light incident portions thereof traveling at a faster rate than said conveyor to impart rotary movement to the bottles to facilitate the inspection of the contents thereof.

13. An inspecting apparatus as set forth in claim 12 wherein resilient backing rollers coact with the transmission band on the edge thereof opposite to the bottles to control the support for the bottles afforded thereby.

SAMUEL H. ELLISON.